US010378659B2

(12) United States Patent
Scott et al.

(10) Patent No.: US 10,378,659 B2
(45) Date of Patent: Aug. 13, 2019

(54) GATE VALVE PROTECTOR SLEEVE

(71) Applicant: FMC Technologies, Inc., Houston, TX (US)

(72) Inventors: Gregory J. Scott, Houston, TX (US); Sahil Saini, Houston, TX (US); Brian Swagerty, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 15/718,656

(22) Filed: Sep. 28, 2017

(65) Prior Publication Data
US 2018/0087673 A1 Mar. 29, 2018

Related U.S. Application Data

(60) Provisional application No. 62/400,858, filed on Sep. 28, 2016.

(51) Int. Cl.
*F16K 3/02* (2006.01)
*E21B 34/06* (2006.01)
*F16K 25/04* (2006.01)
*E21B 43/26* (2006.01)

(52) U.S. Cl.
CPC ............ *F16K 3/0236* (2013.01); *E21B 34/06* (2013.01); *F16K 3/0281* (2013.01); *F16K 25/04* (2013.01); *E21B 43/26* (2013.01)

(58) Field of Classification Search
CPC ...... F16K 3/0236; F16K 25/04; F16K 3/0281; F16K 3/0227; E21B 34/06; E21B 43/26
See application file for complete search history.

(56) References Cited

U.S. PATENT DOCUMENTS

| 293,329 A | * | 2/1884 | Jennings | F16K 3/0227 251/328 |
| 564,378 A | * | 7/1896 | Jenkins | F16K 3/0227 251/328 |
| 2,606,740 A | * | 8/1952 | Allen | F16K 3/0227 251/314 |
| 2,777,664 A | * | 1/1957 | Bryant | F16K 3/0236 251/174 |
| 2,810,542 A | * | 10/1957 | Bryant | F16K 3/0227 251/172 |

(Continued)

FOREIGN PATENT DOCUMENTS

| CN | 201170340 | * | 12/2008 | |
| DE | 2403936 A1 | * | 8/1975 | ........... F16K 3/0227 |

(Continued)

OTHER PUBLICATIONS

Office Action issued in corresponding Canadian Application No. 2,980,589 dated Sep. 14, 2018 (5 pages).

*Primary Examiner* — Marina A Tietjen
(74) *Attorney, Agent, or Firm* — Osha Liang LLP

(57) ABSTRACT

In one aspect, this disclosure relates to a protector sleeve for a frac gate valve. The disclosed protector sleeve prevents frac sand and other particulates from becoming trapped between the seat and the seat pockets. In another aspect, this disclosure relates to a gate valve including the protector sleeve described above. The gate valve may include two protector sleeves, one disposed proximate the contact surfaces of each of the two seats and the two seat pockets.

18 Claims, 12 Drawing Sheets

(56) References Cited

U.S. PATENT DOCUMENTS

| | | | | |
|---|---|---|---|---|
| 3,612,483 A * | 10/1971 | Pool | F16K 1/226 | 251/306 |
| 4,376,526 A * | 3/1983 | Freeman | F16K 3/02 | 251/167 |
| 4,401,292 A * | 8/1983 | Whaley | F16K 3/186 | 251/172 |
| 4,519,582 A * | 5/1985 | Freeman | F16K 3/02 | 251/167 |
| 4,759,529 A * | 7/1988 | Berger | F16K 3/0236 | 251/174 |
| 5,090,661 A * | 2/1992 | Parks, Jr. | F16K 3/16 | 251/172 |
| 5,201,872 A * | 4/1993 | Dyer | F16K 3/0236 | 251/172 |
| 5,533,738 A * | 7/1996 | Hoffmann | F16K 5/205 | 251/172 |
| 6,446,664 B1 * | 9/2002 | Parsons | F16K 25/005 | 137/315.02 |
| 7,481,239 B2 * | 1/2009 | McGuire | F16K 3/0236 | 137/242 |
| 8,413,677 B1 * | 4/2013 | Coffman | F15B 13/024 | 137/487.5 |
| 8,794,593 B2 * | 8/2014 | Kahn | F16K 3/0227 | 251/195 |
| 8,973,897 B2 * | 3/2015 | Cordova | F16K 3/02 | 137/15.23 |
| 9,885,420 B2 * | 2/2018 | Sundararajan | F16K 3/0218 | |
| 2004/0178381 A1 * | 9/2004 | Sundararajan | F16K 3/0227 | 251/175 |
| 2013/0168586 A1 | 7/2013 | Cordova et al. | | |
| 2015/0014568 A1 * | 1/2015 | Sundararajan | F16K 3/0236 | 251/328 |
| 2017/0191570 A1 * | 7/2017 | Roberts | E21B 34/02 | |

FOREIGN PATENT DOCUMENTS

| | | | | |
|---|---|---|---|---|
| DE | 202012006362 U1 * | 7/2012 | | F16K 3/0254 |
| WO | WO-2012139504 A1 * | 10/2012 | | F16K 3/0227 |
| WO | WO-2017158077 A1 * | 9/2017 | | E21B 29/08 |

* cited by examiner

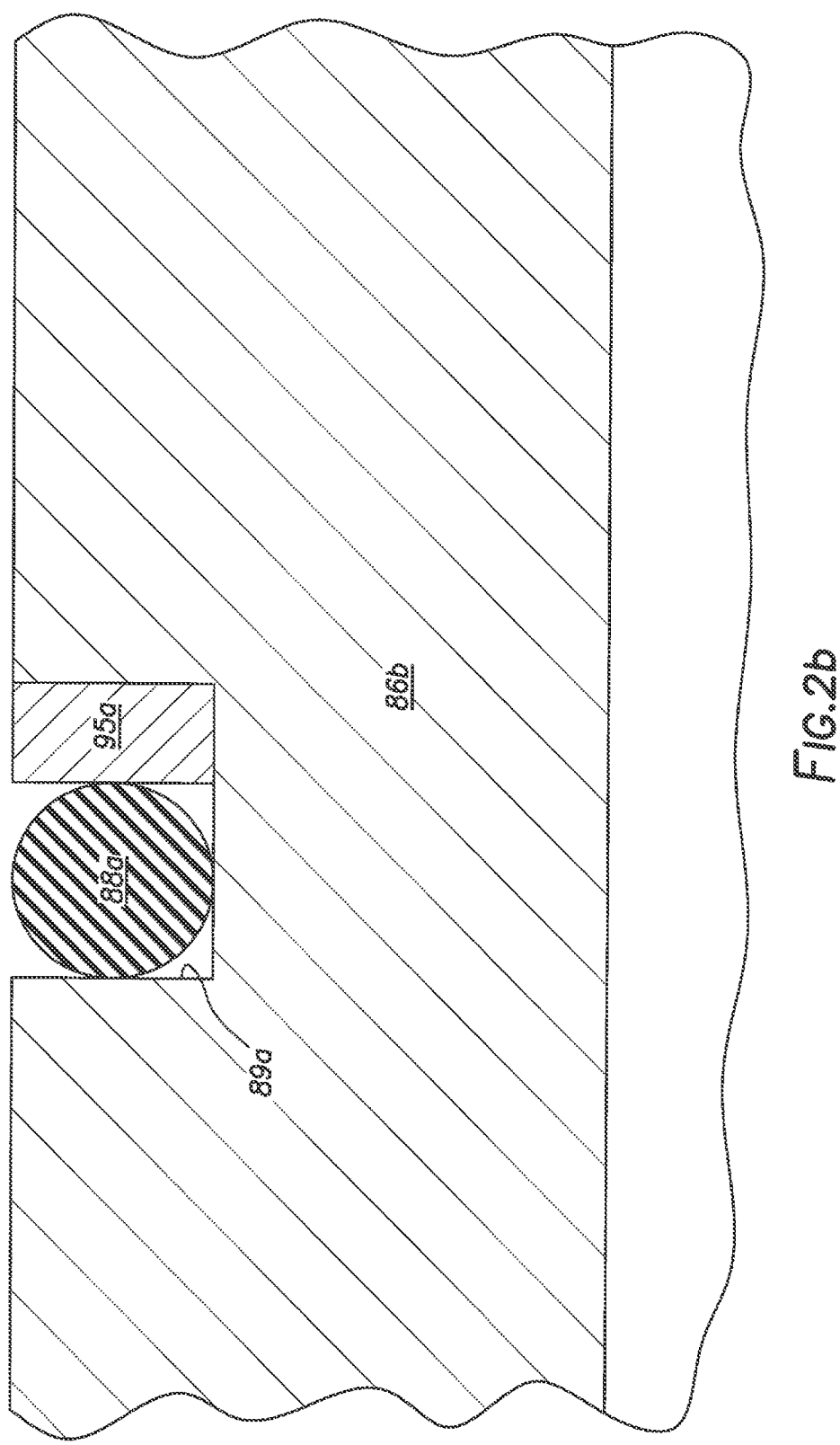

US 10,378,659 B2

GATE VALVE PROTECTOR SLEEVE

BACKGROUND

Gate valves are popular in industrial applications for several reasons. They allow the full diameter of the flow bore to be opened, thereby efficiently maximizing flow for a flow bore of a particular diameter. Gate valves are also capable of securely closing against fluid flow, even in high pressure applications. Therefore, they are frequently chosen for use in high pressure and corrosive or erosive environments, such as those found in frac, downhole, or subsea applications. In these environments, gate valves may be exposed to high pressures, high temperatures or low temperatures, oil, corrosive fluids, and erosive elements such as frac sand and other particulates suspended in fluid. The necessity of disposing valves deep underground or underwater or connecting them to components that are disposed deep underground or underwater for these applications also makes it difficult, expensive, and time-consuming to repair or replace valves. Further, failure of valves in these applications can have catastrophic results.

FIG. 1 shows a typical prior art frac gate valve. Metal seats 2a and 2b are disposed within seat pockets 4a and 4b formed in valve body 6. The metal seats 2a and 2b surround the flow bore 8. Gate 10 is raised and lowered between the metal seats 2a and 2b. Springs 14a and 14b press the metal seats 2a and 2b against the gate 10. Spring energized seals 16a and 16b seal the metal seats 2a and 2b against the seat pockets 4a and 4b formed in the body of valve 6. The metal seats may prevent fluid communication between the upstream and downstream bores and between the flow bore 8 and the body cavity 12 by forming seals with the gate 10 on one side and with the seat pockets 4a and 4b on the other side.

Erosive elements such as frac sand and other particulates suspended in fluid can cause substantial damage to frac gate valve components, especially at high pressures and extreme temperatures. In particular, particulates may become trapped between the contact surfaces of the seat and the seat pocket. Particulates trapped between the seat and the seat pocket cause two major problems for frac gate valve operation.

First, trapped particulates cause gate drag. Gate drag increases the operating torque required to raise and lower the gate and may increase the time required to move the gate between the fully open position and the fully closed position. Gate drag increases the amount of time that the gate is in a partially open position, the position in which the gate is most susceptible to pitting in corrosive or erosive environments. Pitting can prevent the gate, especially the lower portion of the gate, from sealing properly to the seat assembly. Gate drag also increases the stress placed on the gate, the seat assembly, and the mechanism used to raise and lower the gate. In some instances, gate drag can cause the frac gate valve to become seized and inoperable.

Second, trapped particulates cause seat and seat pocket erosion. The particulates trapped between the seat and the seat pocket erode the contact surfaces of the seat pocket and the seat. Erosion of the contact surfaces forms pits between the seat and the seat pocket that fluid from the flow bore may enter. This fluid may corrode the contact surfaces of the seat pocket and the seat, making the gap between the contact surfaces larger and allowing more particulates and fluid to enter, leading to more corrosion and erosion. Excessive sand buildup may defeat the spring energized seal. Damage to the spring mechanism and the contact surfaces allows fluid and particulates to flow between the seat and the seat pocket. Repairing damage to the seat and the seat pocket requires a large amount of rework to ensure good sealing surfaces. The seat pocket must be machined to remove the pitted surface, forming an "oversized" seat pocket. The oversized seat pocket requires an oversized seat to mate with it. Accordingly, in order to deal with changing sizes of pockets, current seats must be made available in different sizes for valves of a single size. This repair process requires halting valve use and removing the valve, making it undesirable. Further, the selective fit of the seat introduces complexity and potential for error into the assembly process for a gate valve.

Given these shortcomings in current frac gate valves, there is a need for a means to protect the metal-to-metal sealing surfaces of the seat and the seat pocket of frac gate valves from frac sand and other particulates.

SUMMARY OF THE DISCLOSURE

In one aspect, this disclosure relates to a protector sleeve for a frac gate valve. The disclosed protector sleeve prevents frac sand and other particulates from becoming trapped between the seat and the seat pockets. The disclosed protector sleeve is therefore ideal for use in applications in which corrosive materials, frac sand, or other particulates are flowed or pumped through the gate valve at high or low pressure.

In another aspect, this disclosure relates to a gate valve including the protector sleeve described above. The gate valve may include two protector sleeves, one disposed proximate the contact surfaces of each of the two seats and the two seat pockets.

Other aspects and advantages will be apparent from the following description and the appended claims.

BRIEF DESCRIPTION OF DRAWINGS

FIG. 2b is a cross-section view of a sleeve protector with an optional anti-extrusion ring in accordance with the present disclosure.

DETAILED DESCRIPTION

Figure 1:
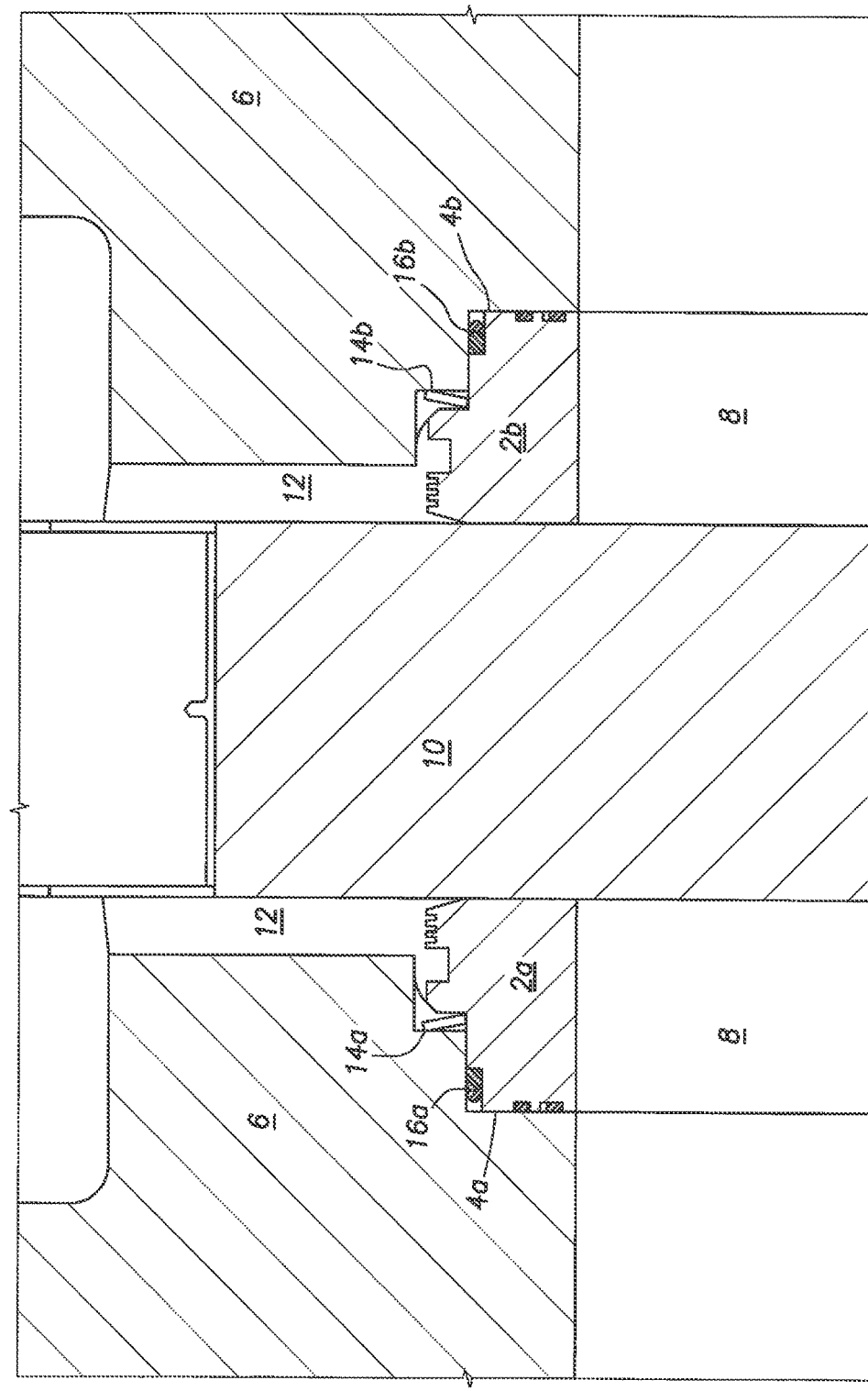
FIG. 1 is a cross-section view of a portion of a prior art gate valve.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments disclosed herein generally relate to a protector sleeve for a frac gate valve and a frac gate valve including one or more sleeve protectors.

Figure 2A:
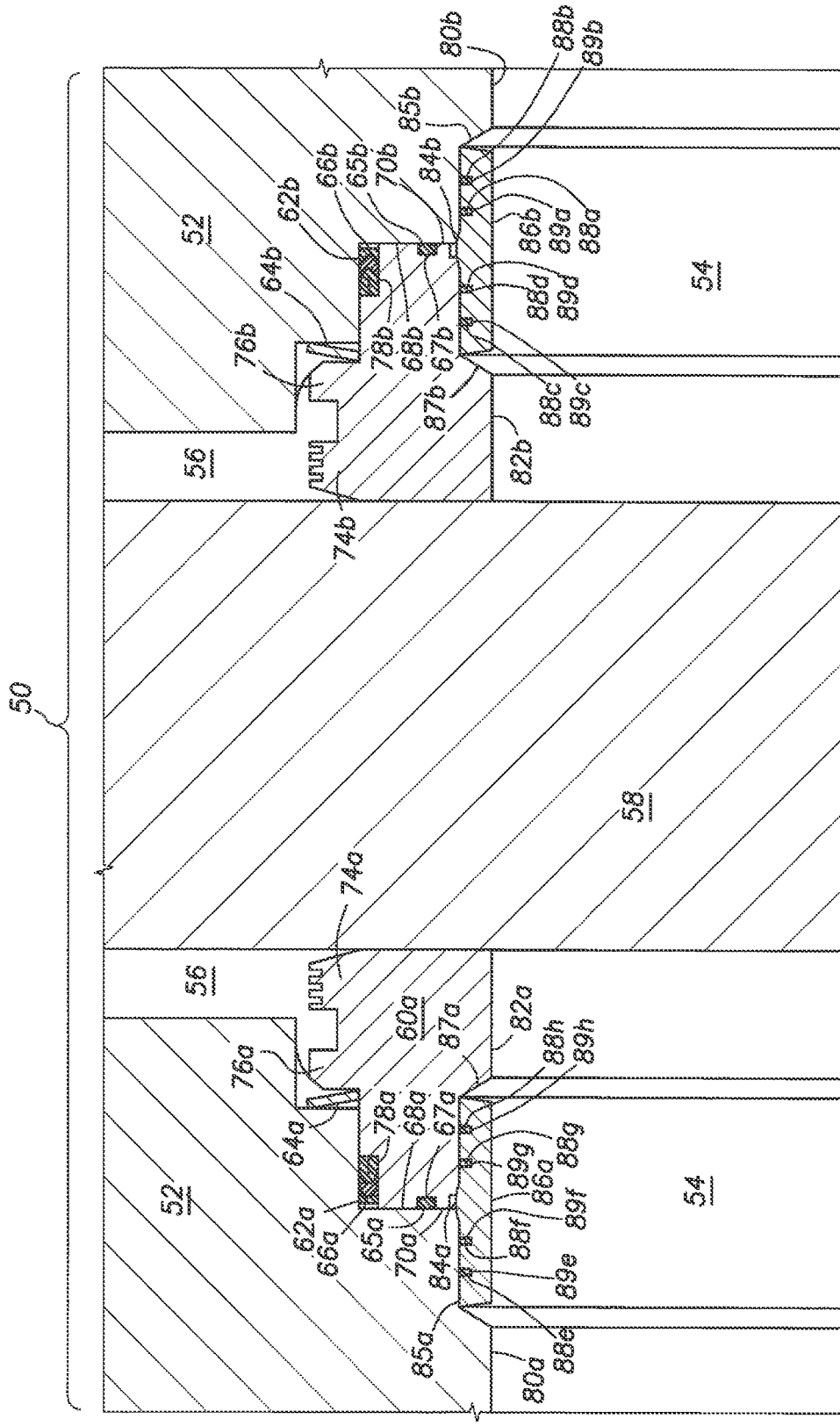
FIG. 2a is a cross-section view of a portion of a gate valve with protector sleeves in accordance with the present disclosure.

FIG. 2a shows a portion of a frac gate valve 50 in accordance with the present disclosure. A valve body 52 surrounds a flow bore 54 and a body cavity 56. Fluid can flow through the flow bore 54 in either direction. A gate 58 moves between an open position within the body cavity 56 and a closed position within the flow bore 54 to alternatively allow fluid flow through the flow bore, to restrict fluid flow, or to halt fluid flow at the valve. Seats 60a and 60b located on either side of the gate 58 surround the flow bore 54 and form seals with both the gate 58 and seat pockets 62a and 62b formed in the valve body 52. The seats 60a and 60b may prevent or restrict fluid communication between the flow bore 54 and the body cavity 56 by forming seals with the gate 58 on one side and with the seat pockets 62a and 62b formed in the valve body 52 on the other side.

Seat size indicators 74a and 74b may protrude from the outer surfaces of the seats 60a and 60b proximate the gate 58. The seat size indicators 74a and 74b indicate the size of the seats 60a and 60b for fitting with the seat pockets 62a and 62b. Spring catches 76a and 76b protrude from the outer surfaces of the seats 60a and 60b proximate the valve body 52. Springs 64a and 64b may be disposed between the spring catches 76a and 76b and the valve body 52. Springs 64a and 64b may press the seats 60a and 60b against the gate 58. Seal pockets 78a and 78b may be formed in the distal faces 68a and 68b of the seats 60a and 60b. Spring energized seals 66a and 66b may be disposed in seal pockets 78a and 78b. Spring energized seals 66a and 66b may seal to the seat pockets 62a and 62b. One skilled in the art will recognize that seat size indicators 74a and 74b, spring catches 76a and 76b, springs 64a and 64b, seal pockets 78a and 78b, and spring energized seals 66a and 66b are optional components of the gate valve disclosed herein.

The seal between the seats 60a and 60b and the seat pockets 62a and 62b is formed between the spring energized seals 66a and 66b and the radial faces 70a and 70b of the seat pockets 62a and 62b. Seals 65a and 65b may be disposed in seal pockets 67a and 67b formed in the distal faces 68a and 68b of the seats 60a and 60b. Seals 65a and 65b may assist in forming a seal between the seats 60a and 60b and the seat pockets 62a and 62b. Seals 65a and 65b may be integral to the valve body 52. Grooves 84a and 84b may be formed in the inner surfaces 80a and 80b of the valve body 52 and the inner surfaces 82a and 82b of the seats 60a and 60b. Grooves 84a and 84b may be proximate the junctions of the distal faces 68a and 68b of the seats 60a and 60b and the radial faces 70a and 70b of the seat pockets 62a and 62b. Protector sleeves 86a and 86b may be disposed in the recesses or grooves 84a and 84b formed by shoulders 85a and 85b on valve body 52 and shoulders 87a and 87b on seats 60a and 60b, where the shoulders 85a, 85b, 87a, and 87b may have similar inner diameters. The outer corners of shoulders 85a, 85b, 87a, and 87b may be beveled or angled.

The protector sleeves 86a and 86b cover the junctions of the distal faces 68a and 68b of the seats 60a and 60b and the radial faces 70a and 70b of the seat pockets 62a and 62b; restated, protector sleeves 86a and 86b overlie the interface between the seats 60a, 60b and the radial faces of the valve body 52, extending at least some distance upstream and downstream of the interface. The protector sleeves 86a and 86b may prevent or restrict fluid communication between the flow bore 54 and the junctions of the distal faces 68a and 68b of the seats 60a and 60b and the radial faces 70a and 70b of the seat pockets 62a and 62b. The protector sleeves 86a and 86b may thereby protect the distal faces 68a and 68b of the seats 60a and 60b, the radial faces 70a and 70b of the seat pockets 62a and 62b, the seals 65a and 65b, and other components of the gate valve from erosion and corrosion. The protector sleeves 86a and 86b may be made of metal, such as a metal similar to that of the valve body, or may be made of other materials, such as a ceramic. In some embodiments, the protector sleeve may be formed of a material that is softer than the valve body, providing a replaceable wear surface preferentially eroded in lieu of erosion of the body 52. The protector sleeves 86a and 86b may be integral to the seats 60a and 60b. Embodiments of a frac gate valve in accordance with the present disclosure may include a one-piece seat assembly that includes the seat and the protector sleeve. The protector sleeve may be manufactured as part of the seat.

One or more o-rings 88c, 88d, 88g, and 88h may be disposed between the protector sleeves 86a and 86b and the inner surfaces 82a and 82b of the seats 60a and 60b and one or more o-rings 88a, 88b, 88e, and 88f may be disposed between the protector sleeves 86a and 86b and the inner surfaces 80a and 80b of the valve body 52. O-rings 88a-88h may be disposed in grooves 89a-89h. Grooves 89a-89h may be formed in the protector sleeves 86a and 86b. Referring to FIG. 2b, anti-extrusion rings 95a-95h may be disposed in grooves 89a-89h alongside o-rings 88a-88h. In either embodiment, the grooves 89a-89h may have sufficient width and depth to accommodate the o-rings 88a-88h and to allow installation of the protector sleeves 86a and 86b in the gate valve, while allowing the o-rings 88a-88h to provide the desired seal. In the embodiments illustrated in FIGS. 3-9, anti-extrusion rings may be disposed alongside the illustrated o-rings.

FIGS. 3a-3f illustrate embodiments of the frac gate valve with a metal-to-metal seal formed between the protector sleeve 86b, the inner surface 80b of the valve body 52, and the inner surface 82b of the seat 60b.

Figure 3A:
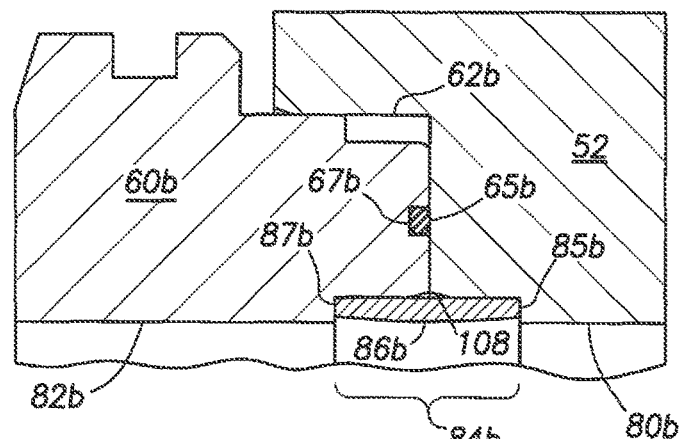
FIG. 3a is a cross-section view of a portion of a gate valve with a protector sleeve having a metal-to-metal seal in accordance with the present disclosure.

FIG. 3a illustrates an embodiment of the frac gate valve with a metal-to-metal seal formed between the protector sleeve 86b, the inner surface 80b of the valve body 52, and the inner surface 82b of the seat 60b. The shoulders 87b and 85b on body 52 and seat pocket 60b, as illustrated, may be beveled or rounded, forming a small secondary groove 108 proximate the junction of the distal face 68b of the seat 60b and the radial face 70b of the seat pocket 62b. The inner surface of the protector sleeve 86b may taper at the edges, such that the inner diameter of the protector sleeve 86b may be smallest proximate the center of the protector sleeve. The smallest inner diameter of the protector sleeve 86b may be about equal to the diameter of the inner surface 82b of the seat 60b and the diameter of the inner surface 80b of the valve body 52. A small clearance may be formed between the sleeve protector 86b and the valve body 52. In this embodiment, the outer edges of shoulders 87b and 85b may be squared, as compared to the beveled or angled shoulders as illustrated in FIG. 2a.

Figure 3B:
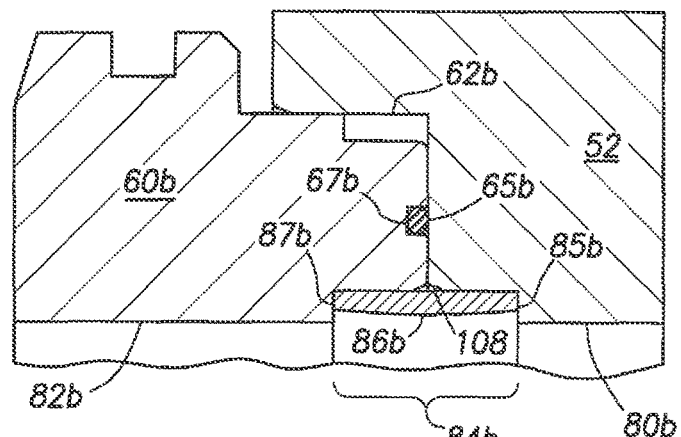
FIG. 3b is a cross-section view of a portion of a gate valve with a protector sleeve having a metal-to-metal seal in accordance with the present disclosure.

FIG. 3b illustrates an embodiment of the frac gate valve with a metal-to-metal seal formed between the protector sleeve 86b, the inner surface 80b of the valve body 52, and the inner surface 82b of the seat 60b. The shoulders 87b and 85b on body 52 and seat pocket 60b, as illustrated, may be beveled or rounded, forming a small secondary groove 108 proximate the junction of the distal face 68b of the seat 60b and the radial face 70b of the seat pocket 62b. The inner surface of the protector sleeve 86b may taper at the edges, such that the inner diameter of the protector sleeve 86b may be smallest at the center. The smallest inner diameter of the protector sleeve 86b may be larger than the diameter of the inner surface 82b of the seat 60b and the diameter of the inner surface 80b of the valve body 52. A small clearance may be formed between the sleeve protector 86b and the valve body 52. In this embodiment, the outer edges of shoulders 87b and 85b may be squared, as compared to the beveled or angled shoulders as illustrated in FIG. 2a.

Figure 3C:
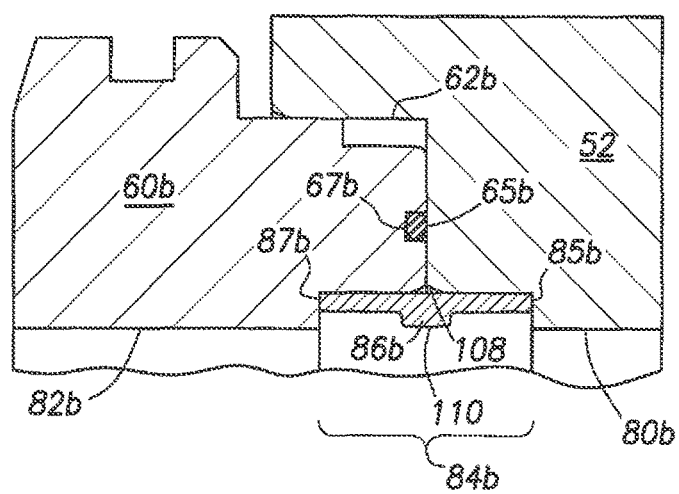
FIG. 3c is a cross-section view of a portion of a gate valve with a protector sleeve having a metal-to-metal seal in accordance with the present disclosure.

FIG. 3c illustrates an embodiment of the frac gate valve with a metal-to-metal seal formed between the protector sleeve 86b, the inner surface 80b of the valve body 52, and the inner surface 82b of the seat 60b. The shoulders 87b and 85b on body 52 and seat pocket 60b, as illustrated, may be beveled or rounded, forming a small secondary groove 108 proximate the junction of the distal face 68b of the seat 60b and the radial face 70b of the seat pocket 62b. The outer surface of the protector sleeve 68b may protrude to fill at least a portion of the secondary groove 108, thereby helping align the protector sleeve 86b during assembly of the gate valve and keeping the protector sleeve 86b aligned during use of the gate valve. The inner surface of the protector sleeve 86b may have a protrusion 110 proximate the center of the protector sleeve 86b, such that the inner diameter of the protrusion 110 may be smaller than the inner diameter of the remainder of the inner surface of the protector sleeve 86b. The inner diameter of the protrusion 110 may be about equal to the diameter of the inner surface 82b of the seat 60b and the diameter of the inner surface 80b of the valve body 52. A small clearance may be formed between the sleeve protector 86b and the valve body 52. In this embodiment, the outer edges of shoulders 87b and 85b may be squared, as compared to the beveled or angled shoulders as illustrated in FIG. 2a.

Figure 3D:
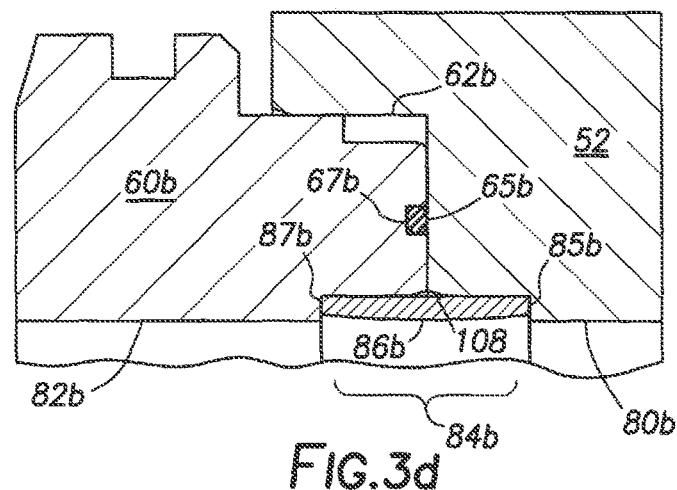
FIG. 3d is a cross-section view of a portion of a gate valve with a protector sleeve having a metal-to-metal seal in accordance with the present disclosure.

FIG. 3d illustrates an embodiment of the frac gate valve with a metal-to-metal seal formed between the protector sleeve 86b, the inner surface 80b of the valve body 52, and the inner surface 82b of the seat 60b. The shoulders 87b and 85b on body 52 and seat pocket 60b, as illustrated, may be beveled or rounded, forming a small secondary groove 108 proximate the junction of the distal face 68b of the seat 60b and the radial face 70b of the seat pocket 62b. The inner surface of the protector sleeve 86b may taper at the edges, such that the inner diameter of the protector sleeve 86b may be smallest at the center. The smallest inner diameter of the protector sleeve 86b may be about equal to the diameter of the inner surface 82b of the seat 60b and the diameter of the inner surface 80b of the valve body 52. A small clearance may be formed between the sleeve protector 86b and the valve body 52. Compared to the sleeve protector 86b in the embodiment shown in FIG. 3a, the thickness and width of the sleeve protector 86b shown in FIG. 3d may be greater relative to the size of the seat 60b and the valve body 52. In this embodiment, the outer edges of shoulders 87b and 85b may be squared, as compared to the beveled or angled shoulders as illustrated in FIG. 2a.

Figure 3E:
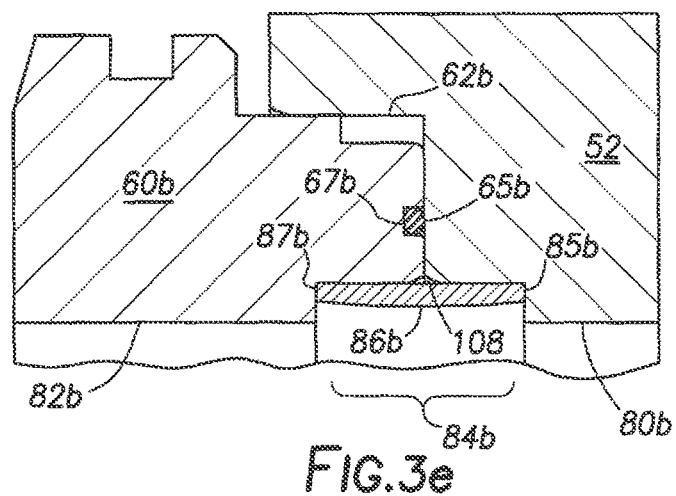
FIG. 3e is a cross-section view of a portion of a gate valve with a protector sleeve having a metal-to-metal seal in accordance with the present disclosure.

FIG. 3e illustrates an embodiment of the frac gate valve with a metal-to-metal seal formed between the protector sleeve 86*b*, the inner surface 80*b* of the valve body 52, and the inner surface 82*b* of the seat 60*b*. The shoulders 87*b* and 85*b* on body 52 and seat pocket 60*b*, as illustrated, may be beveled or rounded, forming a small secondary groove 108 proximate the junction of the distal face 68*b* of the seat 60*b* and the radial face 70*b* of the seat pocket 62*b*. The inner surface of the protector sleeve 86*b* may taper at the edges, such that the inner diameter of the protector sleeve 86*b* may be smallest at the center. The smallest inner diameter of the protector sleeve 86*b* may be larger than the diameter of the inner surface 82*b* of the seat 60*b* and the diameter of the inner surface 80*b* of the valve body 52. A small clearance may be formed between the sleeve protector 86*b* and the valve body 52. Compared to the sleeve protector 86*b* in the embodiment shown in FIG. 3*b*, the thickness and width of the sleeve protector 86*b* shown in FIG. 3*e* may be greater relative to the size of the seat 60*b* and the valve body 52. In this embodiment, the outer edges of shoulders 87*b* and 85*b* may be squared, as compared to the beveled or angled shoulders as illustrated in FIG. 2*a*.

Figure 3F:
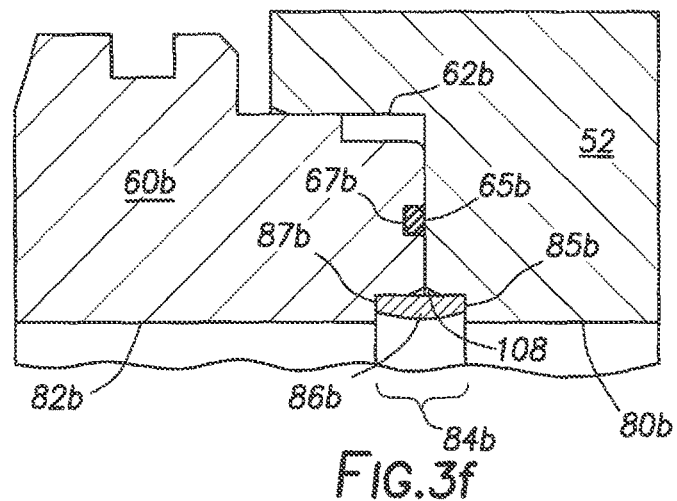
FIG. 3f is a cross-section view of a portion of a gate valve with a protector sleeve having a metal-to-metal seal in accordance with the present disclosure.

FIG. 3*f* illustrates an embodiment of the frac gate valve with a metal-to-metal seal formed between the protector sleeve 86*b*, the inner surface 80*b* of the valve body 52, and the inner surface 82*b* of the seat 60*b*. The shoulders 87*b* and 85*b* on body 52 and seat pocket 60*b*, as illustrated, may be beveled or rounded, forming a small secondary groove 108 proximate the junction of the distal face 68*b* of the seat 60*b* and the radial face 70*b* of the seat pocket 62*b*. The inner surface of the protector sleeve 86*b* may taper at the edges, such that the inner diameter of the protector sleeve 86*b* may be smallest at the center. The smallest inner diameter of the protector sleeve 86*b* may be about equal to the diameter of the inner surface 82*b* of the seat 60*b* and the diameter of the inner surface 80*b* of the valve body 52. A small clearance may be formed between the sleeve protector 86*b* and the seat 60*b*. Compared to the sleeve protector 86*b* in the embodiment shown in FIG. 3*a*, the width of the groove 84*b* the sleeve protector 86*b* shown in FIG. 3*f* may be significantly narrower relative to the size of the seat 60*b* and the valve body 52. In this embodiment, the outer edges of shoulders 87*b* and 85*b* may be squared, as compared to the beveled or angled shoulders as illustrated in FIG. 2*a*.

FIGS. 4*a*-4*e* illustrate embodiments of the frac gate valve with a press fit seal formed between the protector sleeve 86*b* and the inner surface 80*b* of the seat 60*b*. These embodiments include one or more grooves in the body 52 and/or protector sleeve 86*b* in which an o-ring or other type of sealing element may be disposed.

Figure 4A:
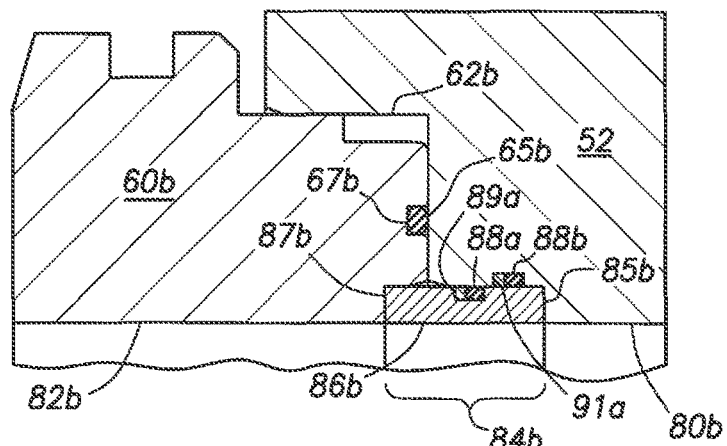
FIG. 4a is a cross-section view of a portion of a gate valve with a protector sleeve with o-rings disposed between the sleeve protector and the valve body in accordance with the present disclosure.

FIG. 4*a* illustrates an embodiment of the frac gate valve with a press fit seal formed between the protector sleeve 86*b* and the inner surface 82*b* of the seat 60*b*. The groove 84*b* in which the protector sleeve 86*b* is disposed may be off center, such that a greater width of the groove 84*b* is formed in the inner surface 80*b* of the valve body 52 than in the inner surface 82*b* of the seat 60*b*. Two o-rings 88*a* and 88*b* may be disposed between the protector sleeve 86*b* and the inner surface 80*b* of the valve body 52. The first o-ring 88*a* may be disposed in a groove 89*a* formed in the protector sleeve 86*b*. The second o-ring 88*b* may be disposed in a groove 91*a* formed in the valve body 52. The grooves 89*a* and 91*a* may have sufficient width and depth to accommodate the o-rings 88*a* and 88*b* and to allow installation of the protector sleeve 86*b* in the gate valve, while allowing the o-rings 88*a* and 88*b* to provide the desired seal. The inner surface of the protector sleeve may be flush with the inner surface 82*b* of the seat 60*b* and the inner surface 80*b* of the valve body 52. In this embodiment, the outer edges of shoulders 87*b* and 85*b* may be squared, as compared to the beveled or angled shoulders as illustrated in FIG. 2*a*.

Figure 4B:
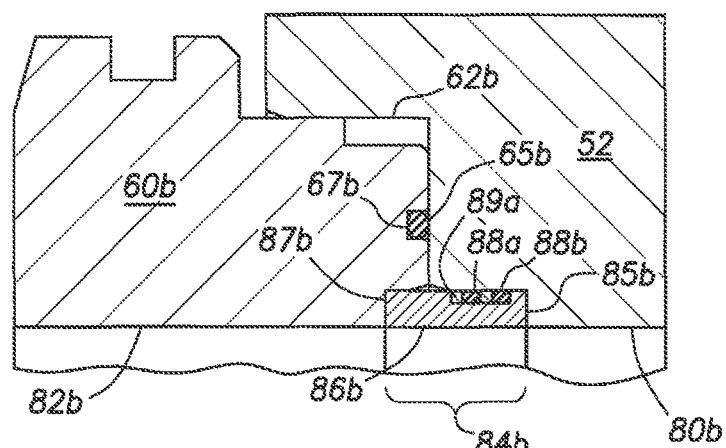
FIG. 4b is a cross-section view of a portion of a gate valve with a protector sleeve with o-rings disposed between the sleeve protector and the valve body in accordance with the present disclosure.

FIG. 4*b* illustrates an embodiment of the frac gate valve with a press fit seal formed between the protector sleeve 86*b* and the inner surface 82*b* of the seat 60*b*. The groove 84*b* in which the protector sleeve 86*b* is disposed may be off center, such that a greater width of the groove 84*b* is formed in the inner surface 80*b* of the valve body 52 than in the inner surface 82*b* of the seat 60*b*. Two or more o-rings 88*a* and 88*b* may be disposed between the protector sleeve 86*b* and the inner surface 80*b* of the valve body 52. The o-rings 88*a* and 88*b* may be disposed in a single groove 89*a* formed in the protector sleeve 86*b*. The groove 89*a* may have sufficient width and depth to accommodate the o-rings 88*a* and 88*b* and to allow installation of the protector sleeve 86*b* in the gate valve, while allowing the o-rings 88*a* and 88*b* to provide the desired seal. The inner surface of the protector sleeve may be flush with the inner surface 82*b* of the seat 60*b* and the inner surface 80*b* of the valve body 52. In this embodiment, the outer edges of shoulders 87*b* and 85*b* may be squared, as compared to the beveled or angled shoulders as illustrated in FIG. 2*a*.

Figure 4C:
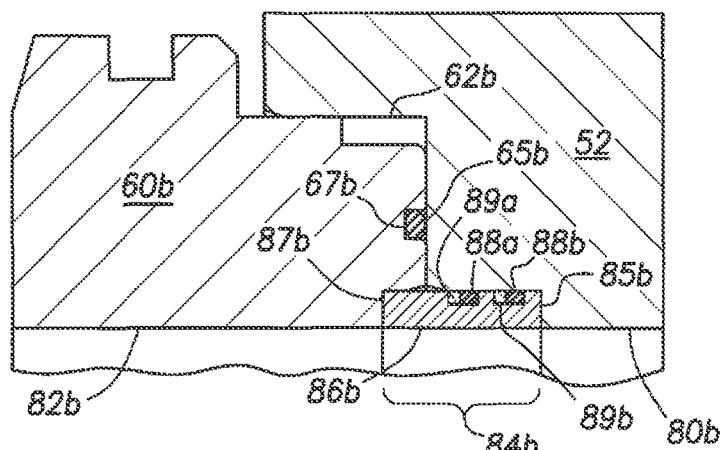
FIG. 4c is a cross-section view of a portion of a gate valve with a protector sleeve with o-rings disposed between the sleeve protector and the valve body in accordance with the present disclosure.

FIG. 4*c* illustrates an embodiment of the frac gate valve with a press fit seal formed between the protector sleeve 86*b* and the inner surface 82*b* of the seat 60*b*. The groove 84*b* in which the protector sleeve 86*b* is disposed may be off center, such that a greater width of the groove 84*b* is formed in the inner surface 80*b* of the valve body 52 than in the inner surface 82*b* of the seat 60*b*. Two o-rings 88*a* and 88*b* may be disposed between the protector sleeve 86*b* and the inner surface 80*b* of the valve body 52. The first o-ring 88*a* may be disposed in a first groove 89*a* formed in the protector sleeve 86*b*. The second o-ring 88*b* may be disposed in a second groove 89*b* formed in the protector sleeve 86*b*. The grooves 89*a* and 89*b* may have sufficient width and depth to accommodate the o-rings 88*a* and 88*b* and to allow installation of the protector sleeve 86*b* in the gate valve, while allowing the o-rings 88*a* and 88*b* to provide the desired seal. The inner surface of the protector sleeve may be flush with the inner surface 82*b* of the seat 60*b* and the inner surface 80*b* of the valve body 52. A small clearance may be formed between the sleeve protector 86*b* and the valve body 52. In this embodiment, the outer edges of shoulders 87*b* and 85*b* may be squared, as compared to the beveled or angled shoulders as illustrated in FIG. 2*a*.

Figure 4D:
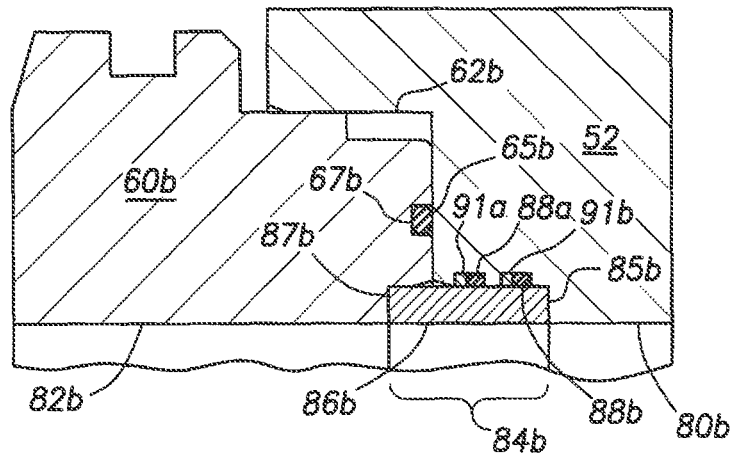
FIG. 4d is a cross-section view of a portion of a gate valve with a protector sleeve with o-rings disposed between the sleeve protector and the valve body in accordance with the present disclosure.

FIG. 4*d* illustrates an embodiment of the frac gate valve with a press fit seal formed between the protector sleeve 86*b* and the inner surface 82*b* of the seat 60*b*. The groove 84*b* in which the protector sleeve 86*b* is disposed may be off center, such that a greater width of the groove 84*b* is formed in the inner surface 80*b* of the valve body 52 than in the inner surface 82*b* of the seat 60*b*. Two o-rings 88*a* and 88*b* may be disposed between the protector sleeve 86*b* and the inner surface 80*b* of the valve body 52. The first o-ring 88*a* may be disposed in a first groove 91*a* formed in the seat 60*b*. The second o-ring 88*b* may be disposed in a second groove 91*b* formed in the seat 60*b*. The grooves 91*a* and 91*b* may have sufficient width and depth to accommodate the o-rings 88*a* and 88*b* and to allow installation of the protector sleeve 86*b* in the gate valve, while allowing the o-rings 88*a* and 88*b* to provide the desired seal. The inner surface of the protector sleeve may be flush with the inner surface 82*b* of the seat 60*b* and the inner surface 80*b* of the valve body 52. A small clearance may be formed between the sleeve protector 86*b* and the valve body 52. In this embodiment, the outer edges of shoulders 87*b* and 85*b* may be squared, as compared to the beveled or angled shoulders as illustrated in FIG. 2*a*.

Figure 4E:
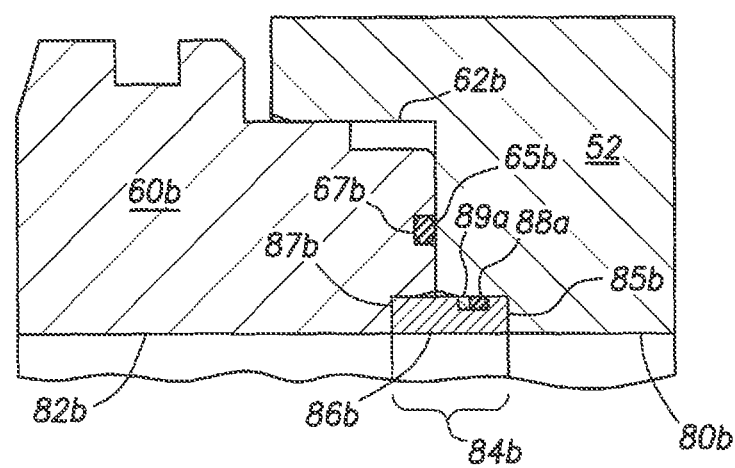
FIG. 4e is a cross-section view of a portion of a gate valve with a protector sleeve with o-rings disposed between the sleeve protector and the valve body in accordance with the present disclosure.

FIG. 4*e* illustrates an embodiment of the frac gate valve with a press fit seal formed between the protector sleeve 86*b* and the inner surface 82*b* of the seat 60*b*. The groove 84*b* in which the protector sleeve 86*b* is disposed may be off center, such that a greater width of the groove 84*b* is formed in the inner surface 80*b* of the valve body 52 than in the inner surface 82*b* of the seat 60*b*. An o-ring 88*a* may be disposed between the protector sleeve 86*b* and the inner surface 80*b* of the valve body 52. The o-ring 88*a* may be disposed in a groove 89*a* formed in the protector sleeve 86*b*. The groove 89*a* may have sufficient width and depth to accommodate the o-rings 88*a* and to allow installation of the protector sleeve 86*b* in the gate valve, while allowing the o-rings 88*a* to provide the desired seal. The inner surface of the protector sleeve may be flush with the inner surface 82*b* of the seat 60*b* and the inner surface 80*b* of the valve body 52. A small clearance may be formed between the sleeve protector 86*b* and the valve body 52. In this embodiment, the outer edges of shoulders 87*b* and 85*b* may be squared, as compared to the beveled or angled shoulders as illustrated in FIG. 2*a*.

FIGS. 5*a*-5*e* illustrate embodiments of the frac gate valve which include one or more grooves in the body 52, the seat 60*b*, and/or protector sleeve 86*b* in which an o-ring or other type of sealing element may be disposed.

Figure 5A:
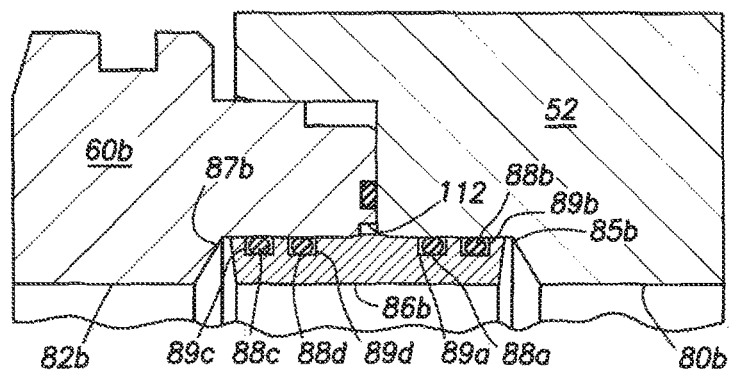
FIG. 5a is a cross-section view of a portion of a gate valve with a protector sleeve with o-rings disposed between the sleeve protector and the valve body and between the sleeve protector and the seat in accordance with the present disclosure.

FIG. 5*a* illustrates an embodiment of the frac gate valve with two o-rings 88*e* and 88*d* disposed between the protector sleeve 86*b* and the inner surface 82*b* of the seat 60*b* and two o-rings 88*a* and 88*b* disposed between the protector sleeve 86*b* and the inner surface 80*b* of the valve body 52. O-rings 88*a*-88*d* may be disposed in grooves 89*a*-89*d* formed in the protector sleeve 86*b*. The grooves 89*a*-89*d* may have sufficient width and depth to accommodate the o-rings 88*a*-88*d* and to allow installation of the protector sleeve 86*b* in the gate valve, while allowing the o-rings 88*a*-88*d* to provide the desired seal. The inner corners of shoulders 87*b* and 85*b* on body 52 and seat pocket 60*b*, as illustrated, may be machined to form a small gap 112 proximate the junction of the distal face 68*b* of the seat 60*b* and the radial face 70*b* of the seat pocket 62*b*. The outer surface of the protector sleeve 86*b* may protrude outward to at least partially fill the gap 112, thereby helping align the protector sleeve 86*b* during assembly of the gate valve and keeping the protector sleeve 86*b* aligned during use of the gate valve. The outer corners of shoulders 85*b* and 87*b* may slant outward towards the flow bore 54. The edges of the protector sleeve 86*b* may slant slightly inwards towards the flow bore 54. A small clearance may be formed between the edges of widest portion of the protector sleeve 86*b* and the narrowest portion of the groove 84*b*. The inner surface of the protector sleeve 86*b* may have about the same diameter as the inner surface 82*b* of the seat 60*b* and the inner surface 80*b* of the valve body 52.

Figure 5B:
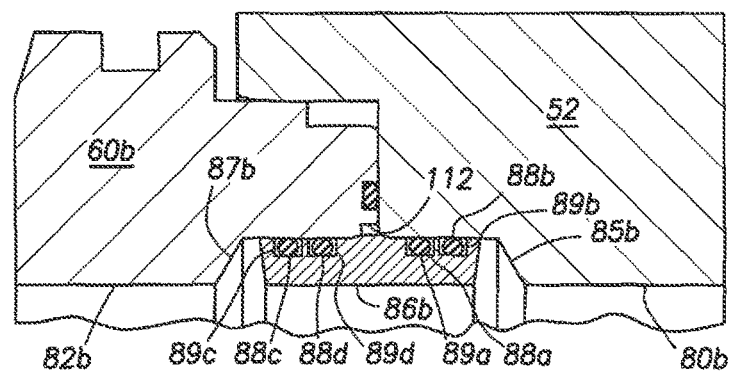
FIG. 5b is a cross-section view of a portion of a gate valve with a protector sleeve with o-rings disposed between the sleeve protector and the valve body and between the sleeve protector and the seat in accordance with the present disclosure.

FIG. 5*b* illustrates an embodiment of the frac gate valve with two o-rings 88*c* and 88*d* disposed between the protector sleeve 86*b* and the inner surface 82*b* of the seat 60*b* and two o-rings 88*a* and 88*b* disposed between the protector sleeve 86*b* and the inner surface 80*b* of the valve body 52. O-rings 88*a*-88*d* may be disposed in grooves 89*a*-89*d* formed in the protector sleeve 86*b*. The grooves 89*a*-89*d* may have sufficient width and depth to accommodate the o-rings 88*a*-88*d* and to allow installation of the protector sleeve 86*b* in the gate valve, while allowing the o-rings 88*a*-88*d* to provide the desired seal. The inner corners of shoulders 87*b* and 85*b* on body 52 and seat pocket 60*b*, as illustrated, may be machined to form a small gap 112 proximate the junction of the distal face 68*b* of the seat 60*b* and the radial face 70*b* of the seat pocket 62*b*. The outer surface of the protector sleeve 86*b* may protrude outward to at least partially fill the gap 112, thereby helping align the protector sleeve 86*b* during assembly of the gate valve and keeping the protector sleeve 86*b* aligned during use of the gate valve. The outer corners of shoulders 85*b* and 87*b* may slant outward towards the flow bore 54. The edges of the protector sleeve 86*b* slant slightly inwards towards the flow bore 54. A clearance is formed between the edges of the widest portion of the protector sleeve 86*b* and the narrowest portion of the groove 84*b*. Compared to the embodiment shown in FIG. 5*a*, the clearance in the embodiment shown in FIG. 5*b* may be larger. The inner surface of the sleeve protector 86*b* may have the same diameter as the inner surface 82*b* of the seat 60*b* and the inner surface 80*b* of the valve body 52.

Figure 5C:
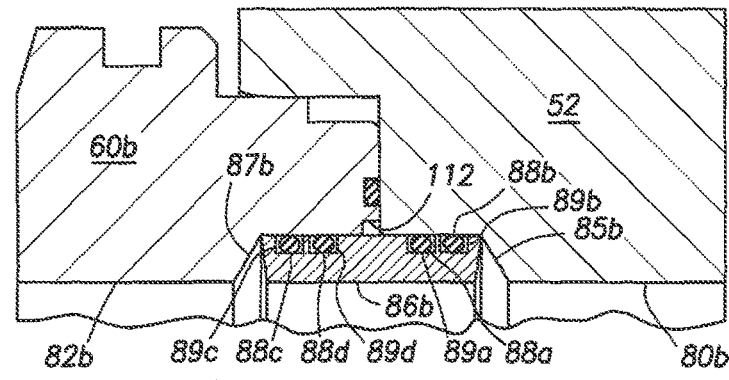
FIG. 5c is a cross-section view of a portion of a gate valve with a protector sleeve with o-rings disposed between the sleeve protector and the valve body and between the sleeve protector and the seat in accordance with the present disclosure.

FIG. 5*c* illustrates an embodiment of the frac gate valve with two o-rings 88*c* and 88*d* disposed between the protector sleeve 86*b* and the inner surface 82*b* of the seat 60*b* and two o-rings 88*a* and 88*b* disposed between the protector sleeve 86*b* and the inner surface 80*b* of the valve body 52. O-rings 88*a*-88*d* may be disposed in grooves 89*a*-89*d* formed in the protector sleeve 86*b*. The grooves 89*a*-89*d* may have sufficient width and depth to accommodate the o-rings 88*a*-88*d* and to allow installation of the protector sleeve 86*b* in the gate valve, while allowing the o-rings 88*a*-88*d* to provide the desired seal. The inner corners of shoulders 87*b* and 85*b* on body 52 and seat pocket 60*b*, as illustrated, may be machined to form a small gap 112 proximate the junction of the distal face 68*b* of the seat 60*b* and the radial face 70*b* of the seat pocket 62*b*. The outer corners of shoulders 85*b* and 87*b* may slant outward towards the flow bore 54. The edges of the protector sleeve 86*b* may slant slightly inwards towards the flow bore 54. The edges of the widest portion of the protector sleeve 86*b* may be flush with the narrowest portion of the groove 84*b*. The inner surface of the sleeve protector 86*b* may have the same diameter as the inner surface 82*b* of the seat 60*b* and the inner surface 80*b* of the valve body 52.

Figure 5D:
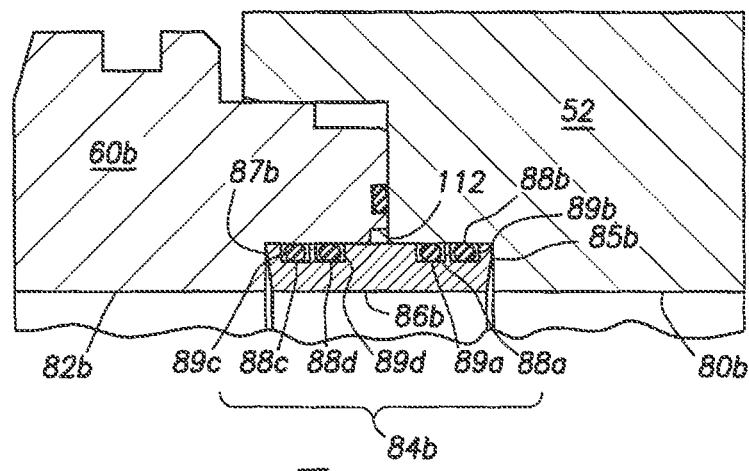
FIG. 5d is a cross-section view of a portion of a gate valve with a protector sleeve with o-rings disposed between the sleeve protector and the valve body and between the sleeve protector and the seat in accordance with the present disclosure.

FIG. 5*d* illustrates an embodiment of the frac gate valve with two o-rings 88*c* and 88*d* disposed between the protector sleeve 86*b* and the inner surface 82*b* of the seat 60*b* and two o-rings 88*a* and 88*b* disposed between the protector sleeve 86*b* and the inner surface 80*b* of the valve body 52. O-rings 88*a*-88*d* may be disposed in grooves 89*a*-89*d* formed in the protector sleeve 86*b*. The grooves 89*a*-89*d* may have sufficient width and depth to accommodate the o-rings 88*a*-88*d* and to allow installation of the protector sleeve 86*b* in the gate valve, while allowing the o-rings 88*a*-88*d* to provide the desired seal. The inner corners of shoulders 87*b* and 85*b* on body 52 and seat pocket 60*b*, as illustrated, may be machined to form a small gap 112 proximate the junction of the distal face 68*b* of the seat 60*b* and the radial face 70*b* of the seat pocket 62*b*. The edges of the protector sleeve 86*b* may slant slightly inwards towards the flow bore 54. A small clearance may be formed between the edges of widest portion of the protector sleeve 86*b* and the groove 84*b*. The inner surface of the sleeve protector 86*b* may have the same diameter as the inner surface 82*b* of the seat 60*b* and the inner surface 80*b* of the valve body 52. In this embodiment, the outer edges of shoulders 87*b* and 85*b* may be squared, as compared to the beveled or angled shoulders as illustrated in FIG. 2*a*.

Figure 5E:
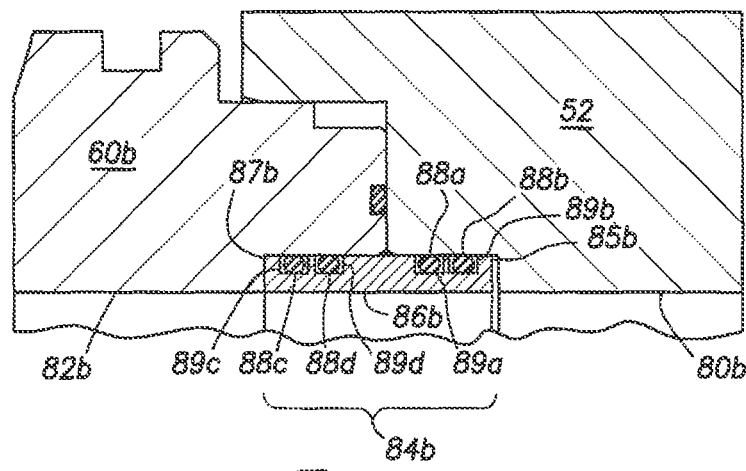
FIG. 5e is a cross-section view of a portion of a gate valve with a protector sleeve with o-rings disposed between the sleeve protector and the valve body and between the sleeve protector and the seat in accordance with the present disclosure.

FIG. 5*e* illustrates an embodiment of the frac gate valve with two o-rings 88*c* and 88*d* disposed between the protector sleeve 86*b* and the inner surface 82*b* of the seat 60*b* and two o-rings 88*a* and 88*b* disposed between the protector sleeve 86*b* and the inner surface 80*b* of the valve body 52. O-rings 88*a*-88*d* may be disposed in grooves 89*a*-89*d* formed in the protector sleeve 86*b*. The grooves 89*a*-89*d* may have sufficient width and depth to accommodate the o-rings 88*a*-88*d* and to allow installation of the protector sleeve 86*b* in the gate valve, while allowing the o-rings 88*a*-88*d* to provide the desired seal. The shoulders 87*b* and 85*b* on body 52 and seat pocket 60*b*, as illustrated, may be beveled or rounded, forming a small secondary groove 108 proximate the junction of the distal face 68*b* of the seat 60*b* and the radial face 70*b* of the seat pocket 62*b*. A small clearance may be formed between the edge of the protector sleeve 86*b* and the valve body 52. The inner surface of the sleeve protector 86*b* may have the same diameter as the inner surface 82*b* of the seat 60*b* and the inner surface 80*b* of the valve body 52. In this embodiment, the outer edges of shoulders 87*b* and 85*b* may be squared, as compared to the beveled or angled shoulders as illustrated in FIG. 2*a*.

Figure 6A:
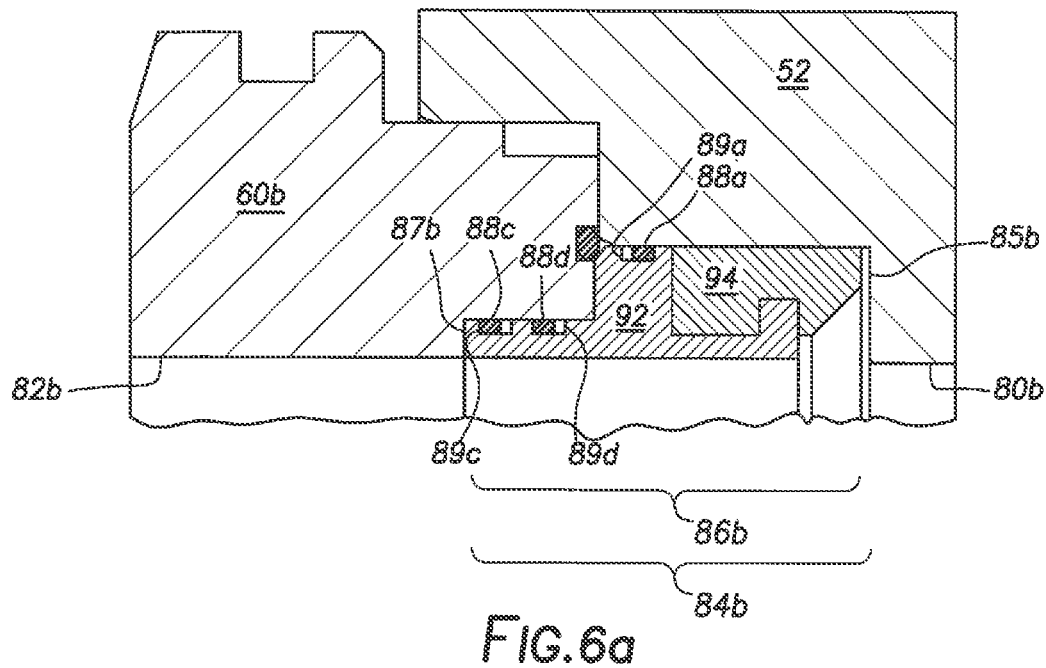
FIG. 6a is a cross-section view of a portion of a gate valve with a protector sleeve including a metal ring and a wiper seal in accordance with the present disclosure.
Figure 6B:
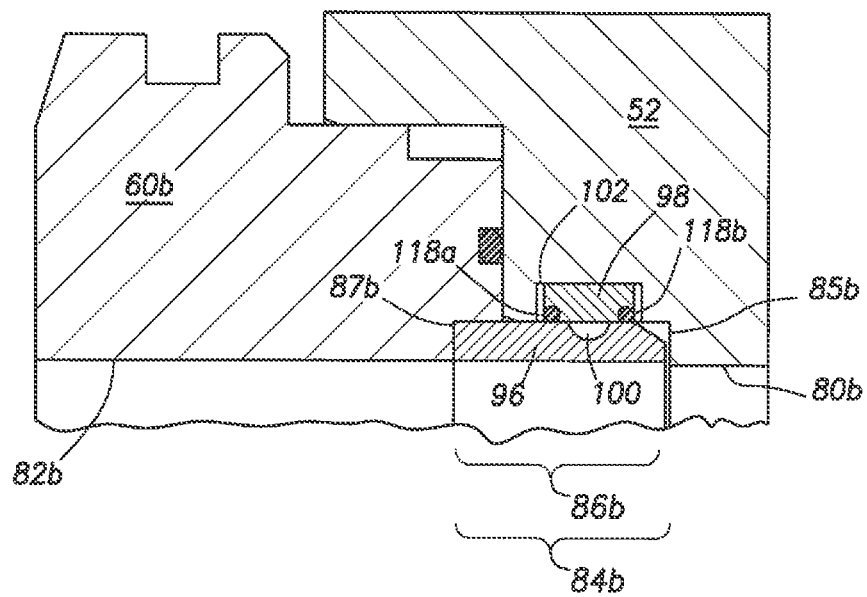
FIG. 6b is a cross-section view of a portion of a gate valve with a protector sleeve including a metal ring and an S-seal in accordance with the present disclosure.
Figure 6C:
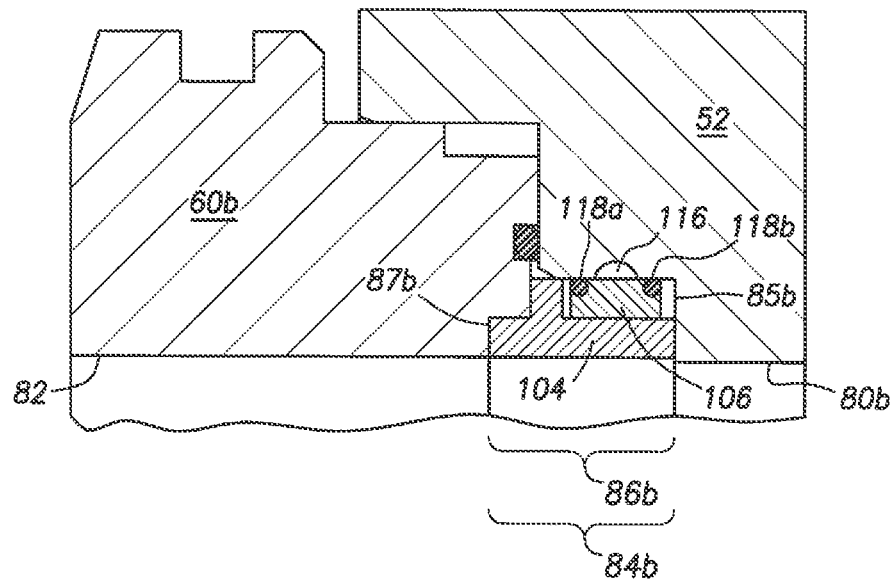
FIG. 6c is a cross-section view of a portion of a gate valve with a protector sleeve including a metal ring and an S-seal in accordance with the present disclosure.

FIGS. 6*a*-6*c* illustrate embodiments of the frac gate valve with a protector sleeve 86*b* including an elastomer sealing element.

FIG. 6*a* illustrates an embodiment of the frac gate valve with a sleeve protector 86*b* which is composed of an outer metal ring 92 and a wiper seal 94. The outer metal ring 92 is proximate the junction of the distal face 68*b* of the seat 60*b* and the radial face 70*b* of the seat pocket 62*b*. The outer metal ring 92 abuts the inner surface 82*b* of the seat 60*b* and the inner surface 80*b* of the valve body 80. The groove 84*b* formed proximate the junction of the distal face 68*b* of the seat 60*b* and the radial face 70*b* of the seat pocket 62*b* may be stepped. The groove 84*b* may be deeper in the inner surface 82*b* of the valve body 52 than in the inner surface 80*b* of the seat. The outer metal ring 92 of the protector sleeve 86*b* may have a stepped outer surface, such that the outer diameter of the outer metal ring 92 may be smaller proximate the inner surface 82*b* of the seat 60*b* and larger proximate the inner surface 80*b* of the valve body 52. Two o-rings 88*c* and 88*d* may be disposed between the outer metal ring 92 and the inner surface 80*b* of the seat 60*b* and one o-ring 88*a* may be disposed between the outer metal ring 92 and the inner surface 82*b* of the valve body 52. The o-rings 88*a*, 88*c*, and 88*d* may be disposed in grooves 89*a*, 89*c*, and 89*d* formed in the outer surface of the outer metal ring 92. The grooves 89*a*, 89*c*, and 89*d* may have sufficient width and depth to accommodate the o-rings 88*a*, 88*c*, and 88*d* and to allow installation of the protector sleeve 86*b* in the gate valve, while allowing the o-rings 88*a*, 88*c*, and 88*d* to provide the desired seal. The outer metal ring 92 may interlock with the wiper seal 94 which abuts the inner surface of the valve body 52. The inner surface of the sleeve protector 86*b* may have about the same diameter as the inner surface 82*b* of the seat 60*b* and the inner surface 80*b* of the valve body 52. A ramped clearance may be formed between the sleeve protector 86*b* and the valve body 52. In this embodiment, the outer edges of shoulders 87*b* and 85*b* may be squared, as compared to the beveled or angled shoulders as illustrated in FIG. 2*a*.

FIG. 6*b* illustrates an embodiment of the frac gate valve with a sleeve protector 86*b* which is composed of an outer metal ring 96 and an S-seal 98. The outer metal ring 96 is proximate the junction of the distal face 68*b* of the seat 60*b* and the radial face 70*b* of the seat pocket 62*b*. The outer metal ring 96 abuts the inner surface 82*b* of the seat 60*b* and the inner surface 80*b* of the valve body 80. A secondary groove 102 may be formed within groove 84*b* on the inner surface 80*b* of the valve body 52. The inner metal ring 98 may be disposed in the secondary groove 102. A groove 100 may be formed in the outer metal ring 96 proximate the S-seal 98. The groove may function as a wear surface. Two springs 118*a* and 118*b* may be disposed between the S-seal 98 and the outer metal ring 96. The springs 118*a* and 118*b* may be integral to the inner metal ring 96. The inner surface of the sleeve protector 86*b* is flush with the inner surface 82*b* of the seat 60*b* and the inner surface 80*b* of the valve body 52. A small clearance may be formed between the sleeve protector 86*b* and the valve body 52. In this embodiment, the outer edges of shoulders 87*b* and 85*b* may be squared, as compared to the beveled or angled shoulders as illustrated in FIG. 2*a*.

FIG. 6*c* illustrates an embodiment of the frac gate valve with a sleeve protector 86*b* which is composed of an outer metal ring 104 and an S-seal 106. The outer metal ring 104 is proximate the junction of the distal face 68*b* of the seat 60*b* and the radial face 70*b* of the seat pocket 62*b*. The outer metal ring 104 abuts the inner surface 82*b* of the seat 60*b* and the inner surface 80*b* of the valve body 80. The groove 84*b* formed proximate the junction of the distal face 68*b* of the seat 60*b* and the radial face 70*b* of the seat pocket 62*b* may be stepped. The groove 84*b* may be deeper in the inner surface 82*b* of the valve body 52 than in the inner surface 80*b* of the seat. The outer metal ring 104 of the protector sleeve 86*b* may have a stepped outer surface, such that the outer diameter of the outer metal ring 104 may be smaller proximate the inner surface 82*b* of the seat 60*b* and larger proximate the inner surface 80*b* of the valve body 52. Proximate the distal portion of the groove 84*b* formed in the valve body 52, a portion of the outer surface of the outer metal ring 104 may have a smaller diameter. The S-seal 106 may be disposed between this portion of the outer metal ring 104 and the inner surface 80*b* of the valve body 52. A secondary groove 116 may be formed in the groove 84*b* on the inner surface 80*b* of the valve body 52. The secondary groove 116 may function as a wear surface. Two springs 118*a* and 118*b* may be disposed between the inner metal ring 98 and the valve body 52. The springs 118*a* and 118*b* may be integral to the inner metal ring 96. The inner surface of the sleeve protector 86*b* may be flush with the inner surface 82*b* of the seat 60*b* and the inner surface 80*b* of the valve body 52. A small clearance may be formed between the sleeve protector 86*b* and the valve body 52. In this embodiment, the outer edges of shoulders 87*b* and 85*b* may be squared, as compared to the beveled or angled shoulders as illustrated in FIG. 2*a*.

Figure 7:
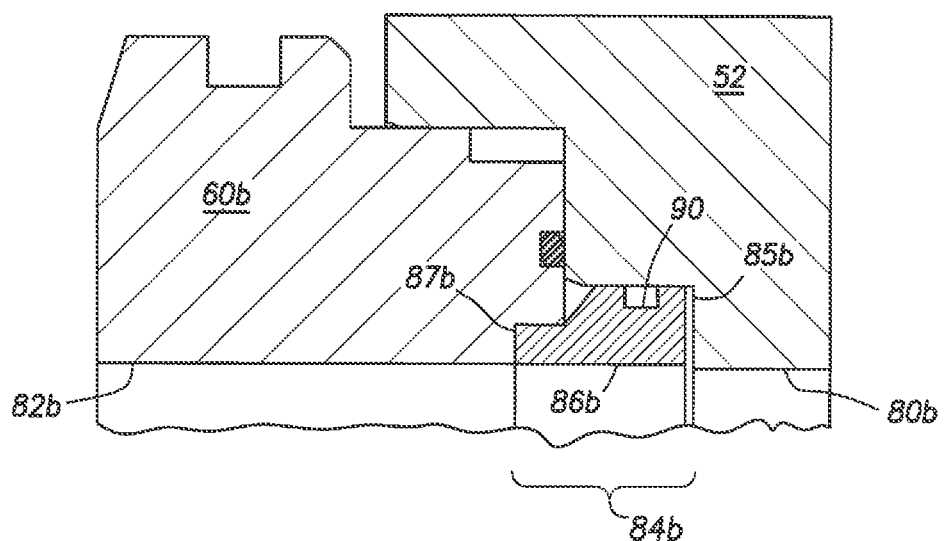
FIG. 7 is a cross-section view of a portion of a gate valve with a protector sleeve disposed in a stepped groove in accordance with the present disclosure.

FIG. 7 illustrates an embodiment of the frac gate valve with a press fit seal formed between the protector sleeve 86*b* and the inner surface 80*b* of the seat 60*b*. The groove 84*b* formed proximate the junction of the distal face 68*b* of the seat 60*b* and the radial face 70*b* of the seat pocket 62*b* is stepped. The groove 84*b* may be deeper in the inner surface 82*b* of the valve body 52 than in the inner surface 80*b* of the seat. The protector sleeve 86*b* may have a stepped outer surface, such that the outer diameter of the protector sleeve 86*b* may be smaller proximate the inner surface 82*b* of the seat 60*b* and larger proximate the inner surface 80*b* of the valve body 52. A ramped region may connect the portions of the outer surface of the protector sleeve 86*b* having the larger and the smaller diameters. A groove 90 may be formed in the portion of the outer surface proximate the inner surface 80*b* of the valve body 52. The interior of the groove 90 may function as a wear surface. The inner surface of the sleeve protector 86*b* may be flush with the inner surface 82*b* of the seat 60*b* and the inner surface 80*b* of the valve body 52. A small clearance may be formed between the sleeve protector 86*b* and the valve body 52. In this embodiment, the outer edges of shoulders 87b and 85b may be squared, as compared to the beveled or angled shoulders as illustrated in FIG. 2a.

Figure 8:
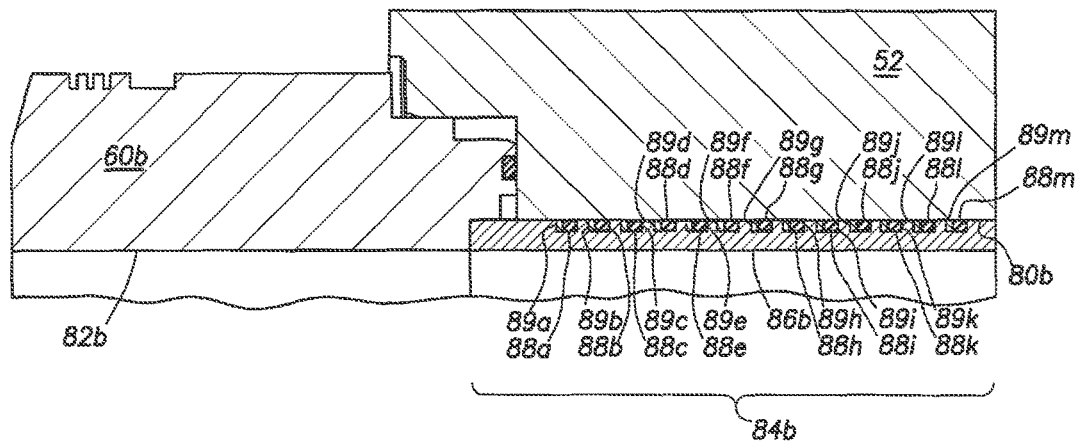
FIG. 8 is a cross-section view of a portion of a gate valve with a protector sleeve and a valve body with an extended groove in accordance with the present disclosure.

FIG. 8 illustrates an embodiment of the frac gate valve with a protector sleeve 86b that extends along the entire inner surface 80b of the valve body 52. A metal-to-metal seal is formed between the protector sleeve 86b and the inner surface 80b of the seat 60b and a plurality of o-rings 88a-88m may be disposed between the protector sleeve 86b and the inner surface 82b of the valve body 52. Anti-extrusion rings 88a-88m may be disposed in grooves 89a-89m formed in the protector sleeve 86b. The grooves 89a-89m may have sufficient width and depth to accommodate the o-rings 88a-88m and to allow installation of the protector sleeve 86b in the gate valve, while allowing the o-rings 88a-88m to provide the desired seal. The inner surface of the protector sleeve may be flush with the inner surface 82b of the seat 60b and the inner surface 80b of the valve body 52. The distal surface of the protector sleeve 86b may be even with the distal surface of the valve body 52. In this embodiment, the outer edges of shoulder 87b may be squared, as compared to the beveled or angled shoulder as illustrated in FIG. 2a.

Figure 9:
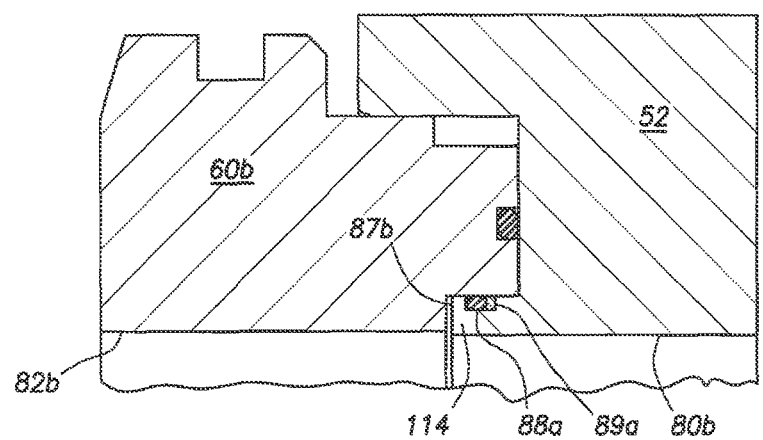
FIG. 9 is a cross-section view of a portion of a gate valve with a valve body with an integral protector protrusion in accordance with the present disclosure.

FIG. 9 illustrates an embodiment of the frac gate valve with an integral protector protrusion 114 formed on the inner surface 80b of the valve body 52. An anti-extrusion ring 88a may be disposed between the protector protrusion 114 and the inner surface 82b of the seat 60b. Anti-extrusion ring 88a may be disposed in a groove 89b formed in the protector protrusion 114. The groove 89a may have sufficient width and depth to accommodate the o-ring 88a and to allow installation of the protector sleeve 86b in the gate valve, while allowing the o-ring 88a to provide the desired seal. A small clearance may be formed between the distal face 68b of the seat 60b and the protector protrusion 114. The inner surface 80b of the valve body 52 may be flush with the inner surface 82b of the seat 60b. In this embodiment, the outer edges of shoulder 87b may be squared, as compared to the beveled or angled shoulder as illustrated in FIG. 2a. The integral protector protrusion 114 may make assembly of the gate valve simpler or easier.

A frac gate valve including one or more sleeve protectors as disclosed herein may be used in drilling operations. The frac gate valve may be installed above ground, below ground, or subsea. Any fluid needed for the drilling operation may be pumped or flowed through the frac gate valve. In particular, fluid in which frac or sand or other particulate matter is suspended may be pumped or flowed through the frac gate valve. The frac gate valve may be placed in a fully open position in which the gate is mostly or completely within the body cavity to allow the fluid being flowed or pumped to pass the frac gate valve. The frac gate valve may also be placed in a fully closed position in which the gate completely obstructs the flow bore. The gate may seal with the seats in the fully closed configuration, preventing the fluid being flowed or pumped from passing the frac gate valve. The movement of the gate between the fully open and the fully closed positions may be controlled to facilitate fracturing or other drilling operations. The movement of the gate between the fully open and the fully closed positions may be informed by the pressure throughout the drilling operation. The sleeve protectors may prevent fluid communication between the flow bore and the junction of the distal face of the seat and the radial face of the seat pocket.

Existing frac gate valves may be retrofit with the protector sleeves herein. The seats may be removed from the frac gate valve. If the valve body can be disassemble to allow easier access to the flow bore, it may be disassembled. Grooves to accommodate the protector sleeve may be machined into the seat and the valve body using any technique known in the art. The frac gate valve may then be reassembled with one or more protector sleeves disposed proximate the interface of one or more seats and the valve body.

One skilled in the art will recognize that embodiments of the present disclosure present several advantages, especially over frac gate valve seat assemblies that do not feature protector sleeves, as described herein. Specifically, the sleeve protectors allow the gate valve to maintain integrity in erosive and corrosive environments such as those present in downhole operations. The protector sleeves prevent fluid communication between the flow bore and the junction of the distal face of the seat and the radial face of the seat pocket. Typical prior art frac gate valves include spring energized seals. The spring energized seals for uni-directional seal, sealing from the body cavity into the seat pocket. The protector sleeve may seal from the seat pocket into the body cavity, thus sealing the seat pocket in both directions. The protector sleeves thereby preventing frac sand or other particulates suspended in the fluid from becoming trapped between the seat and the seat pocket.

Preventing particulates from becoming trapped between the seat and the seat pocket minimizes at least two significant problems for gate valve operation. First, it prevents gate drag caused by trapped particulates. Gate drag increases the operating torque required to raise and lower the gate and may increase the time required to move the gate between the fully open position and the fully closed position. Gate drag increases the amount of time that the gate is in a partially open position, the position in which the gate is most susceptible to pitting in corrosive or erosive environments. Pitting can prevent the gate, especially the lower portion of the gate, from sealing properly to the seat assembly. Gate drag also increases the stress placed on the gate, the seat assembly, and the mechanism used to raise and lower the gate. In some instances, gate drag can cause the frac gate valve to become seized and inoperable. Therefore, preventing particulates from becoming trapped between the seat and the seat pocket prevents damage to the gate from pitting, damage to other components from stress caused by gate drag, and potentially fatal seizing of the valve.

Second, preventing particulates from becoming trapped between the seat and the seat pocket prevents seat and seat pocket erosion. The particulates trapped between the seat and the seat pocket erode the contact surfaces of the seat pocket and the seat. Erosion of the contact surfaces forms pits between the seat and the seat pocket that fluid from the flow bore may enter. This fluid may corrode the contact surfaces of the seat pocket and the seat, making the gap between the contact surfaces larger and allowing more particulates and fluid to enter, leading to more corrosion and erosion. Excessive sand buildup may defeat the spring energized seal. Damage to the spring energized seal and the contact surfaces allows fluid and particulates to flow between the seat and the seat pocket. Repairing damage to the seat and the seat pocket requires a large amount of rework to ensure good sealing surfaces. The seat pocket must be machined to remove the pitted surface, forming an "oversized" seat pocket. The oversized seat pocket requires an oversized seat to mate with it. Accordingly, in order to deal with changing sizes of pockets, current seats must be made available in different sizes for valves of a single size. This repair process requires halting valve use and removing the valve, making it undesirable. Further, the selective fit of the seat introduces complexity and potential for error into the assembly process for a gate valve. In some cases, the valve body may need to be clad and reworked. Therefore, the present disclosure may extend the lifespan of frac gate valves, particularly those used in high pressure and erosive environments. It may also reduce the amount or cost of repairs that must be performed on frac gate valves, thereby preventing costly delays in operations.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A gate valve comprising:
   one or more seats;
   a valve body comprising a radial face of a seat pocket adjacent to and sealingly engaged with each seat; and
   one or more protector sleeves overlying an interface between a distal face of the seat and the radial face of the seat pocket, extending at least some distance upstream and downstream of the interface,
   wherein a gap is formed in the interface between the seat and the valve body, wherein the protector sleeve protrudes outwardly to at least partially fill the gap to align the protector sleeve.

2. The gate valve of claim 1, further comprising a groove formed on an outer surface of at least one of the one or more protector sleeves and an o-ring disposed in the groove, sealing between the protector sleeve and the valve body.

3. The gate valve of claim 1, further comprising a groove formed on an outer surface of at least one of the one or more protector sleeves and an oaring disposed in the groove, sealing between the protector sleeve and the seat.

4. The gate valve of claim 1, further comprising a groove formed on the inner surface of the valve body and an o-ring disposed in the groove, sealing between the protector sleeve and the valve body.

5. The gate valve of claim 1, further comprising a groove formed on the inner surface of the seat and an o-ring disposed in the groove, sealing between the protector sleeve and the seat.

6. The gate valve of claim 1, wherein the radial face of the valve body and the seat are tapered proximate the interface of the radial face of the valve body and the seat, forming a groove and wherein the protector sleeve comprises a protrusion that extends at least partially into the groove.

7. The gate valve of claim 1, wherein both the radial face of the seat pocket and the distal face of the seat are machined proximate the interface of the radial face of the seat pocket and the distal face of the seat, forming a gap, and wherein the protector sleeve comprises a protrusion that extends at least partially into the gap.

8. The gate valve of claim 1, further comprising a spring catch protruding from an outer surface of the seat and the valve body.

9. The gate valve of claim 8, further comprising a spring disposed between the spring catch and the valve body.

10. The gate valve of claim 1, wherein:
    an inner surface of the seat comprises a shoulder,
    an inner surface of the valve body comprises a shoulder, and
    the protector sleeve is disposed in a groove formed by the shoulder of the seat and the shoulder of the valve body.

11. The gate valve of claim 10, wherein the shoulder of the seat comprises an angled surface and the shoulder of the valve body comprises an angled surface.

12. The gate valve of claim 10, wherein the shoulder of the seat is disposed between the protector sleeve and a gate.

13. A gate valve comprising:
    a valve body surrounding a flow bore and a body cavity, wherein a gate is configured to move between an open position within the body cavity and a closed position within the flow bore, the valve body comprising one or more seat pockets with one or more radial faces;
    one or more seats, each seat having at least one distal face adjacent to the radial face of the seat pocket, forming an interface; and
    one or more protector sleeves overlying the interface between the seat and the valve body,
    wherein an outer diameter of each of the one or more protector sleeves is equal at a first end of the protector sleeve and a second end of the protector sleeve, and
    wherein a gap is formed in the interface between the seat and the valve body, wherein the protector sleeve protrudes outwardly to at least partially fill the gap to align the protector sleeve.

14. The gate valve of claim 13, wherein the first end of the protector sleeve is adjacent to the seat and the second end of the protector sleeve is adjacent to the valve body.

15. The gate valve of claim 13, wherein each of the one or more seats comprises a seat size indicator protruding from an outer surface and proximate the gate.

16. The gate valve of claim 13, wherein the seat comprises a shoulder disposed between the protector sleeve and the gate.

17. The gate valve of claim 13, further comprising a seal disposed in a pocket formed in the distal face of the seat between the seat and the valve body.

18. The gate valve of claim 13, further comprising:
    a first groove formed on an outer surface of at least one of the one or more protector sleeves;
    a first o-ring disposed in the first groove, sealing between the protector sleeve and the valve body;
    a second groove formed on an outer surface of at least one of the one or more protector sleeves; and
    a second o-ring disposed in the groove, sealing between the protector sleeve and the seat.

* * * * *